United States Patent
Pratt (10) Patent No.: US 7,392,237 B2
(45) Date of Patent: Jun. 24, 2008

(54) IDENTIFIER CODE TRANSLATION SYSTEM

(75) Inventor: Douglas Charles Pratt, Downingtown, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 495 days.

(21) Appl. No.: 09/973,349

(22) Filed: Oct. 9, 2001

(65) Prior Publication Data

US 2002/0161749 A1 Oct. 31, 2002

Related U.S. Application Data

(60) Provisional application No. 60/286,794, filed on Apr. 26, 2001.

(51) Int. Cl.
*G06F 7/10* (2006.01)

(52) U.S. Cl. .......................................... 707/3
(58) Field of Classification Search ............... 707/3, 707/4, 10, 101, 104.1; 705/26–29, 22
See application file for complete search history.

(56) References Cited

U.S. PATENT DOCUMENTS

| | | | |
|---|---|---|---|
| 5,712,989 A * | 1/1998 | Johnson et al. ............... 707/1 |
| 5,715,453 A * | 2/1998 | Stewart ........................ 715/513 |
| 5,724,575 A * | 3/1998 | Hoover et al. ................. 707/10 |
| 5,740,425 A * | 4/1998 | Povilus ........................ 707/100 |
| 5,913,210 A * | 6/1999 | Call .............................. 707/4 |
| 5,987,472 A | 11/1999 | Serafin ........................ 707/104 |
| 6,055,516 A * | 4/2000 | Johnson et al. .............. 705/27 |
| 6,058,375 A * | 5/2000 | Park ............................. 705/30 |
| 6,112,209 A | 8/2000 | Gusack ........................ 707/101 |
| 6,154,738 A * | 11/2000 | Call ............................. 707/4 |
| 6,301,584 B1 * | 10/2001 | Ranger ........................ 707/103 R |

(Continued)

FOREIGN PATENT DOCUMENTS

EP 0 722 140 A1 7/1996

(Continued)

OTHER PUBLICATIONS

U.S. Appl. No. 60/221,546, filed on Jul. 28, 2000.*

(Continued)

*Primary Examiner*—Kimyen Vu
*Assistant Examiner*—Thomas Gyorfi
(74) *Attorney, Agent, or Firm*—Alexander J. Burke (57) ABSTRACT

A system dynamically maps (and translates) codes and identifier values of any type to corresponding codes and identifiers of other entities. A method for determining a specific identifier code for an object associated with a plurality of identifier codes by a corresponding plurality of entities involves receiving a first message including at least a first identifier code identifying an object. The first identifier code is extracted from the received first message and a second message is generated incorporating the extracted first identifier code. The second message is used for initiating a search of an identifier code database mapping an identifier code associated with a first entity to a corresponding identifier code associated with a second entity. A second identifier code corresponding to the first identifier code is received in response to communicating the second message for initiating a search of the identifier code database. The second message initiates a remote procedure for mapping the first identifier code to a corresponding second identifier code.

20 Claims, 9 Drawing Sheets

U.S. PATENT DOCUMENTS

| | | | |
|---|---|---|---|
| 6,418,441 B1 * | 7/2002 | Call | 707/10 |
| 6,430,541 B1 * | 8/2002 | Brown et al. | 705/28 |
| 6,430,554 B1 * | 8/2002 | Rothschild | 707/3 |
| 6,510,434 B1 * | 1/2003 | Anderson et al. | 707/100 |
| 6,510,989 B1 * | 1/2003 | Ortega | 235/383 |
| 6,535,874 B2 * | 3/2003 | Purcell | 707/3 |
| 6,542,933 B1 * | 4/2003 | Durst, Jr. et al. | 709/229 |
| 6,578,030 B1 * | 6/2003 | Wilmsen et al. | 707/3 |
| 6,708,161 B2 * | 3/2004 | Tenorio et al. | 707/2 |
| 6,775,660 B2 * | 8/2004 | Lin et al. | 707/3 |
| 6,785,671 B1 * | 8/2004 | Bailey et al. | 707/3 |
| 7,062,509 B1 * | 6/2006 | Nenov et al. | 707/104.1 |
| 2001/0029492 A1 * | 10/2001 | Uchikata | 705/64 |
| 2002/0059107 A1 * | 5/2002 | Reich et al. | 705/26 |
| 2002/0059204 A1 * | 5/2002 | Harris | 707/3 |
| 2002/0099622 A1 | 7/2002 | Langhammer | 705/26 |
| 2002/0107861 A1 * | 8/2002 | Clendinning et al. | 707/101 |
| 2002/0111870 A1 * | 8/2002 | Chinnappan et al. | 705/26 |
| 2002/0161745 A1 * | 10/2002 | Call | 707/1 |
| 2003/0115129 A1 * | 6/2003 | Feaver et al. | 705/37 |
| 2003/0177111 A1 * | 9/2003 | Egendorf et al. | 707/3 |
| 2004/0059728 A1 * | 3/2004 | Miller et al. | 707/3 |

FOREIGN PATENT DOCUMENTS

| | | |
|---|---|---|
| GB | 2 320 111 A | 6/1998 |
| WO | WO 9832289 A2 * | 7/1998 |
| WO | WO 01/06357 A1 | 1/2001 |

OTHER PUBLICATIONS

"SQLData SOAP Server" © Jan. 25, 2001 SQLData Systems Inc. http://web.archive.org/web/20010202090100/http://sqldata.com/Soap.htm.*

"SOAP for Java" © Apr. 28, 2000 IBM. http://www.alphaworks.ibm.com/tech/soap4j/.*

"Simple Object Access Protocol (SOAP) 1.1" © May 8, 2000 W3C et al. http://www.w3.org/TR/2000/NOTE-SOAP-20000508/.* e*Index™ Global Identifier-Know Your Customer *See Beyond-Products*.

e*Index™ Global Identifier-In Depth *See Beyond-Products*.

eBusiness Integration—It's not just B2B *See Beyond—Products*.

* cited by examiner

IDENTIFIER CODE TRANSLATION SYSTEM

This is a non-provisional application of provisional application serial No. 60/286,794 by D. Pratt filed Apr. 26, 2001.

FIELD OF THE INVENTION

This invention concerns a system for processing multiple different identifier codes associated with a single object by corresponding multiple different entities such as a manufacturer, wholesaler and retailer, for example.

BACKGROUND OF THE INVENTION

It is common in commerce and industry for different entities such as companies or other organizations for example, to represent an object such as a product, service, resource or any other item of commercial significance, by different internal identifier codes. A problem occurs in integrating computer systems and transferring data between companies concerning commercial transactions involving such objects. Specifically, an identifier code of one entity (e.g., a manufacturer) is not recognized by the computer system of another entity (e.g., a wholesaler) involved in a transaction. Consider a case involving the procurement of an automobile oil filter, for example. A retail store ordering the oil filter part has a stock number. A distributor of the oil filter maintains another different stock number for the same filter. A company that brands the filter assigns a different part number and UPC (Universal Product Code) bar code. The manufacturer maintains yet another different part number. The difference in part numbers and codes used to represent the single part by the different entities involved in the distributorship chain causes significant problems in executing a transaction. A computer system of one entity in the chain needs to know the part number used to identify the object by another entity in the chain to generate purchase orders, for billing, and for other transaction records.

Some known systems address the problem by employing cross-reference mapping files embedded within individual networked applications used by the entities involved in a distribution chain. The mapping files translate (map) identifier codes between the different entities. This approach provides a costly, inflexible mapping system vulnerable to error and identifier code mismatch between mapping files. This approach is also dependent on synchronized update of the different mapping files involving use of complicated network interfaces and multiple, different file formats.

Another known system offered by Seebeyond.com and described at its web site employs a mapping system that involves a centralized mapping database and does not support access to additional remote external mapping databases thereby limiting the scope, flexibility and use of the mapping system.

A system according to the invention principles addresses the described problems and deficiencies.

SUMMARY OF INVENTION

A system dynamically maps (and translates) codes and identifier values of any type (e.g., identifying a product service or resource) to corresponding codes and identifiers of other entities (e.g. companies, organizations and individuals). A method for determining a specific identifier code for an object associated with a plurality of identifier codes by a corresponding plurality of entities involves receiving a first message including at least a first identifier code identifying an object. The first identifier code is extracted from the received first message and a second message is generated incorporating the extracted first identifier code. The second message is used for initiating a search of an identifier code database mapping an identifier code associated with a first entity to a corresponding identifier code associated with a second entity. A second identifier code corresponding to the first identifier code is received in response to communicating the second message for initiating a search of the identifier code database.

In a feature of the invention the second message initiates a remote procedure for mapping the first identifier code to a corresponding second identifier code.

DETAILED DESCRIPTION OF PREFERRED EMBODIMENTS

Figure 1:
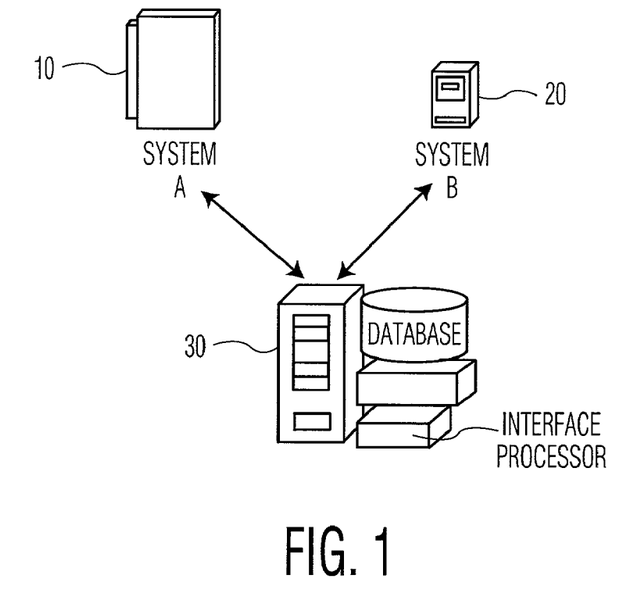
FIG. 1 shows an identifier code translation system involving a centralized identifier code mapping database.

FIG. 1 shows an identifier code translation system involving a centralized mapping database similar to that employed by a SeeBeyond.com product (SeeBeyond's e*Index product). In this configuration, an identifier code of a part used by System A (10) is mapped by an application operating on server 30 to a corresponding identifier code used by System B (20) to identify the same part. The application operating on server 30 uses Internet compatible protocols (or other protocols) in communicating with Systems A and B in support of a transaction involving the part. The server 30 application includes an interface processor supporting exchange of data and communication between applications operating on System A and System B respectively. The server 30 application uses the interface processor and a user defined mapping function residing in a relational database operating on the same server 30. Thereby, System A or System B (e.g., a retailer computer system) may pass a stock number as input parameter to the mapping function residing on server 30 and receive back a corresponding distributor's part number for use in placing an electronic order for the part.

Figure 7:
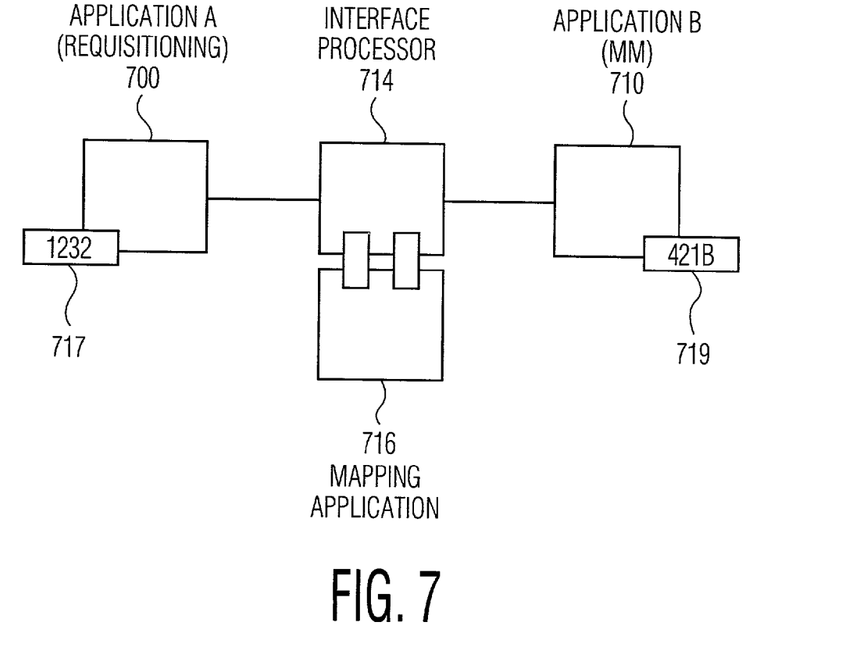
FIG. 7 shows identifier code translation used in a requisitioning transaction, according to invention principles.
Figure 8:
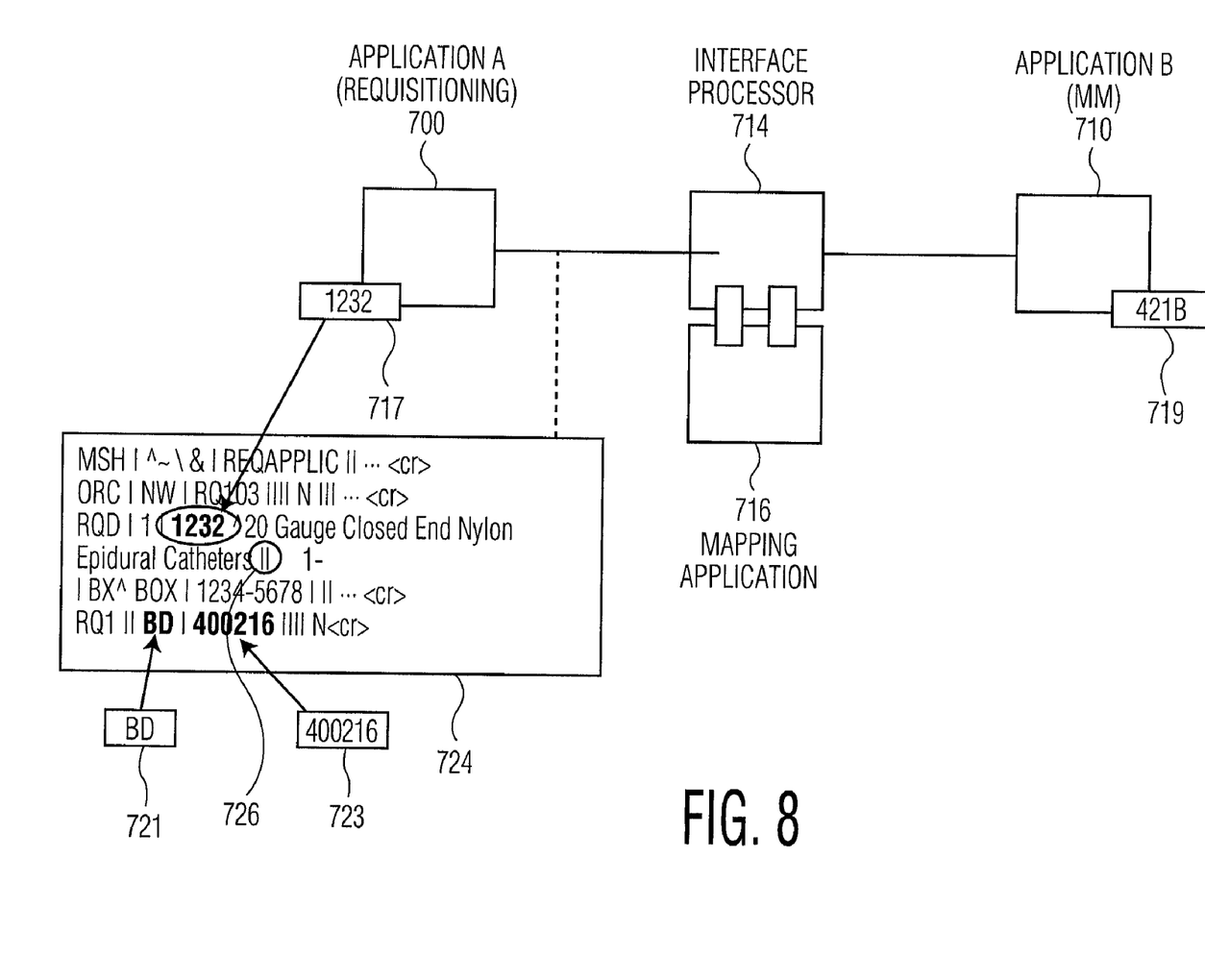
FIG. 8 shows generation of a message by a requisitioning application for processing by an identifier code translation system, according to invention principles.

The operation of the FIG. 1 configuration is exemplified in FIGS. 7 and 8. In the FIG. 7 arrangement, a requisitioning application 700 is networked to a materials management (MM) system 710 using an interface processor 714 communicating with a co-located internal mapping database 716. The Requisitioning System application A communicates a supply order for 20 Gauge Epidural Catheters (B-D Model 400216) to Materials Management System 710 using an HL7 (Health Level 7) protocol compatible message (Information concerning HL7 is available at http://www.hl7.org).The Requisitioning System knows the catheters by its internal code (1232—item 717). The Material Management system has its own internal code (421B—item 719). System 700 does not know the code used by System 710 to identify the Catheters and System 710 does not know the code used by System 700 to identify the same Catheters.

FIG. 8 illustrates the creation and communication of the HL7 compatible message by the Requisitioning System of FIG. 7. Application 700 creates an HL7 format message including the requisitioning system catheter part number code1232 (item 717), the manufacturer identification code BD (item 721) and the manufacturer's catheter part number 400216 (item 723). The Material Management system 710 corresponding part number for the catheter is unknown and is not supplied. This is indicated by the two adjacent "|" characters (item 726). The resulting message is communicated from application 700 to interface processor application 714 which uses co-located mapping application and associated identifier code mapping database 716. Specifically, unit 716 is used to identify the Material Management system part number (item 719) for the catheter for inclusion in a message to be communicated to Material Management system application 710.

The centralized mapping application and associated mapping database system of FIG. 1 (operationally exemplified in FIGS. 7 and 8) is limited to operation in conjunction with a co-located interface processor application (also residing on server 30 of FIG. 1) used for exchanging data between System A and System B. It also does not support access to additional remote or local external mapping applications (and associated databases), thereby limiting the scope, flexibility and use of the mapping system.

Figure 2:
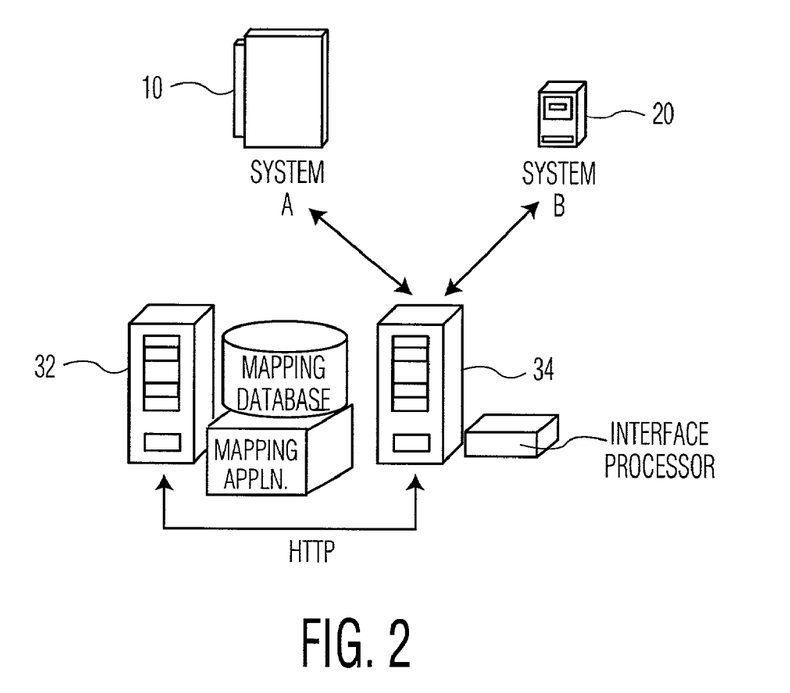
FIG. 2 shows an identifier code translation system involving a centralized identifier code mapping database remote from the application using it, according to invention principles.

FIG. 2 shows an identifier code translation system involving a centralized mapping database used by a remote interface processor application supporting exchange of data and communication between the client applications of System A (10) and System B (20). The interface processor application operates on server 34 and uses the remote mapping application and associated mapping database operating on server 32 through remote calls formatted according to the Internet compatible Simple Object Access Protocol (SOAP), which is expressed in the Internet compatible Extensible Markup Language (XML). The interface processor application on server 34 calls the mapping application and associated database on server 32 using an Internet Hypertext Transport Protocol (HTTP) POST command and receives HTTP compatible responses. In this communication protocol arrangement, the interface processor application advantageously does not need to know the physical network location of the Mapping database, just its name. This is because when using Internet HTTP protocol to POST a mapping request, the underlying infrastructure of the network (specifically, Domain Name Servers and Routers) resolve the server name to a physical address. Thereby, System A (e.g., a retailer computer system) may pass a stock number as input parameter to the interface processor application on server 34 which invokes the remote mapping application and database on server 32 to provide a corresponding distributor's part number back to System A. The use by the interface processor application of the remote mapping application and database is transparent to System A and System A remains oblivious of the location or access requirements of the mapping database on server 32. The use of SOAP, XML and HTTP communication protocols in this manner to invoke a remote mapping database, advantageously enables an Application Service Provider (ASP) to remotely host identifier code mapping functions using Internet standards.

The FIG. 2 configuration advantageously provides a centralized identifier code mapping database that alleviates the need to manually synchronize different identifier code mapping databases and files. The FIG. 2 configuration further advantageously supports communication with remote identifier code mapping databases using standard Internet protocols for simplifying integration and communication with a wide array of networked applications. This may involve the use of the Internet, virtual private networks (VPN), wide-area networks (WAN) and local-area networks (LAN) and enables identifier code mapping functions to be advantageously hosted by an Application Service Provider (ASP). Thereby increasing the range of services an ASP may provide and bill for.

Figure 3:
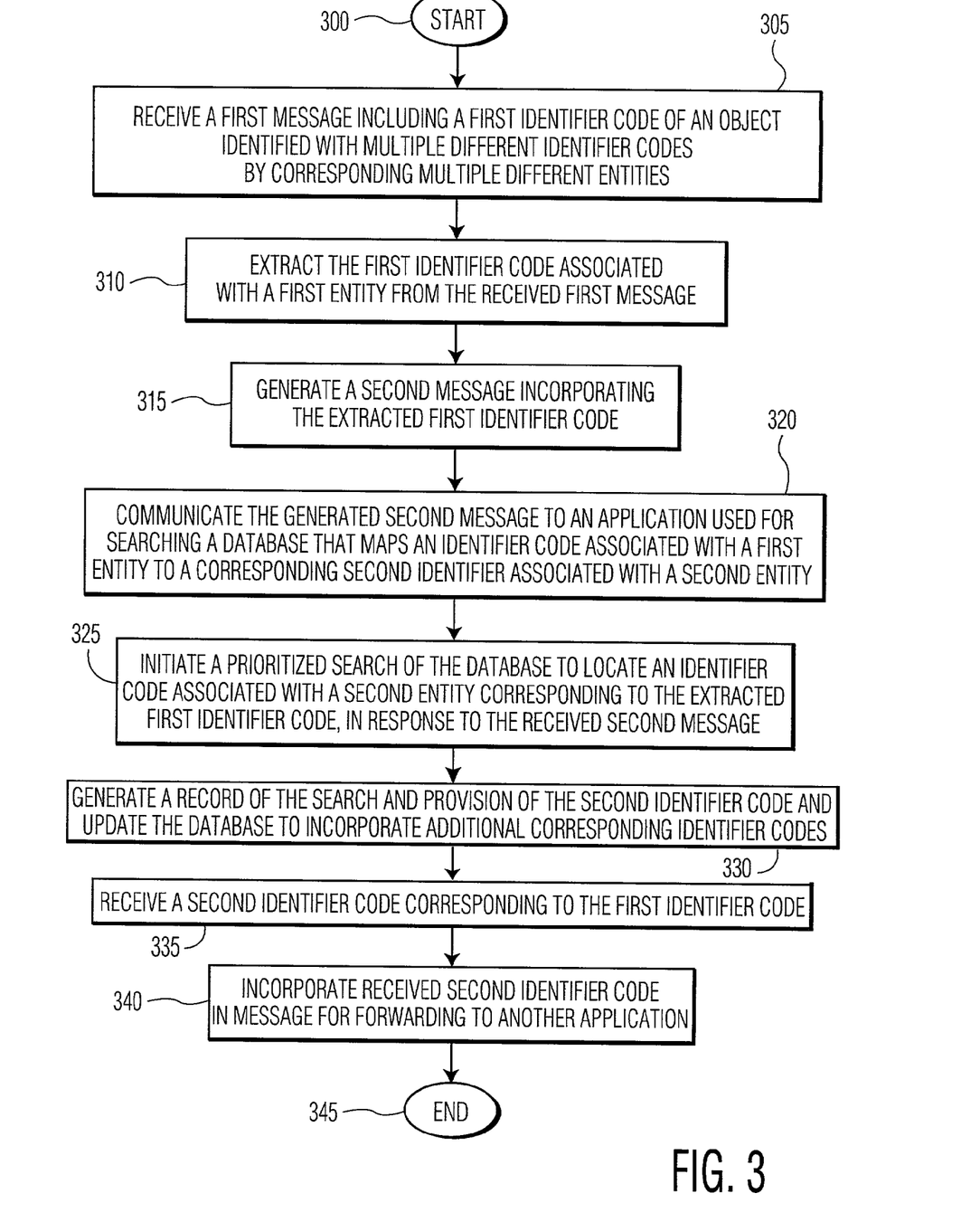
FIG. 3 shows a process used to translate identifier codes involving search and update of one or more identifier code mapping databases remote from the application using it, according to invention principles.
Figure 9:
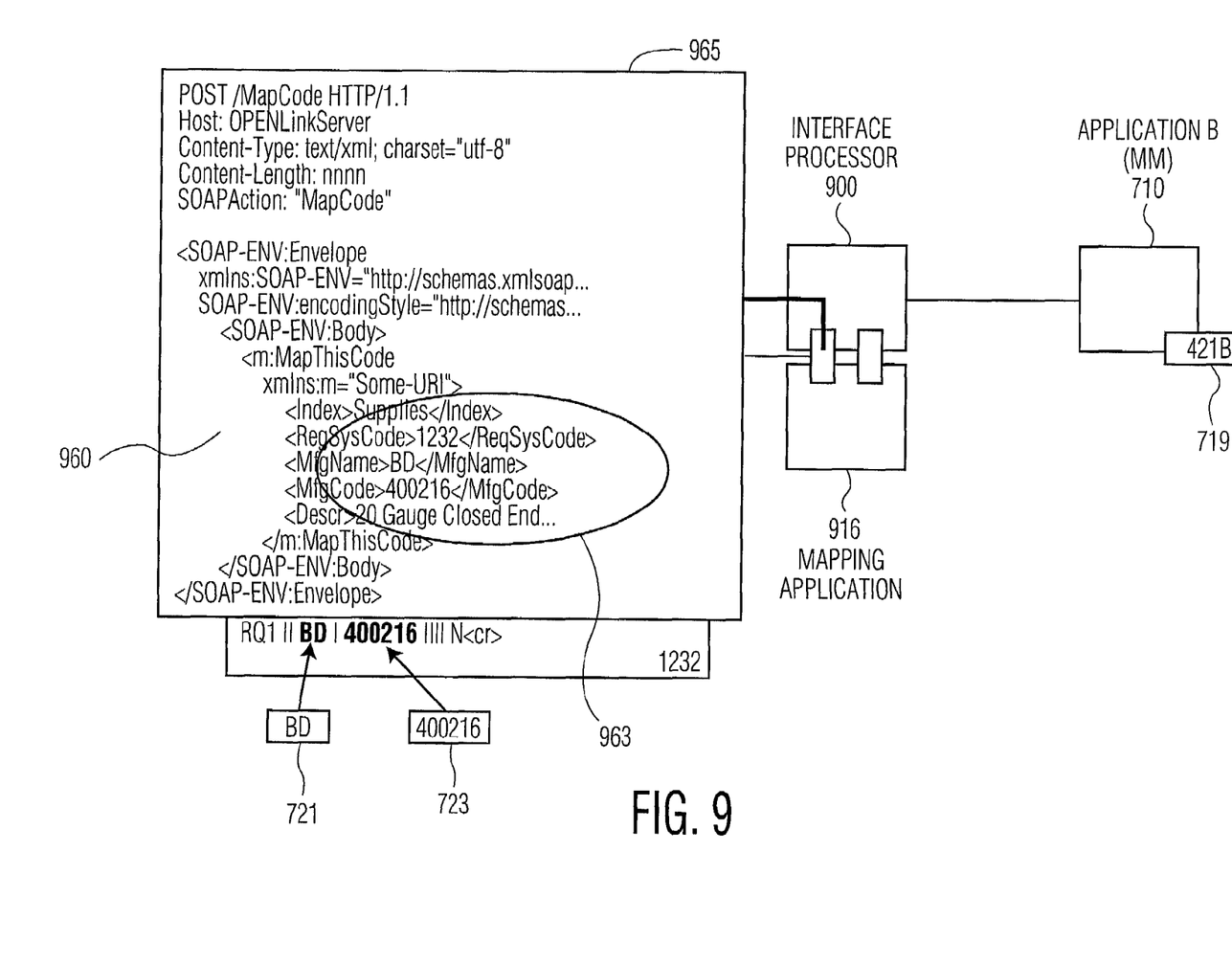
FIG. 9 shows generation of a second message used for initiating a search of an identifier code mapping database in response to a message received from a requisitioning application, according to invention principles.

FIG. 3 shows a process used by an interface processor application 900 of FIG. 9 to translate an identifier code received from an application (e.g., requisitioning application 700 as featured in FIGS. 7-12) involving search and update of a remote mapping database 916 (FIG. 9). The interface processor application may reside on a server, PC, mainframe, wireless device, PDA (Personal Data Assistant) device or another networked device. In step 305, (after the start at step 300) application 900 receives a first HL7 protocol message from application 700. The first message includes a first identifier code (code 1232) of a catheter associated with different codes by a manufacturer and a materials management system application (application 710 of FIG. 9). In other embodiments an identifier code may be used to identify an object by an entity such as a retailer, wholesaler, distributor, manufacturer. seller or service enterprise. Further, an object may comprise other articles of manufacture, a service, a resource or a non-manufactured item.

FIG. 9 illustrates generation of a second message used for initiating a search of an identifier code mapping database in response to a message received from the requisitioning application 700 of FIGS. 7-12. Specifically, in step 310 (FIG. 3), application 900 (FIG. 9) extracts the first identifier code (code 1232 of requisitioning application 700) from the received HL7 compatible protocol message and in step 315 generates an XML compatible message (965 of FIG. 9) incorporating the extracted code (within item 963). In step 320, application 900 communicates the generated message to remote application 916 used for accessing an identifier code mapping database at the remote location. The database maps an identifier code associated with a first entity to a corresponding identifier code identifying the same object (a catheter in the example of FIG. 9) associated with a different second entity. For this purpose, in step 325, application 916 initiates a prioritized search of the remote identifier code mapping database to locate an identifier code corresponding to the requisitioning application 700 code (1232) associated with Materials Management application 710 in response to receiving the XML message from application 900.

Figure 10:
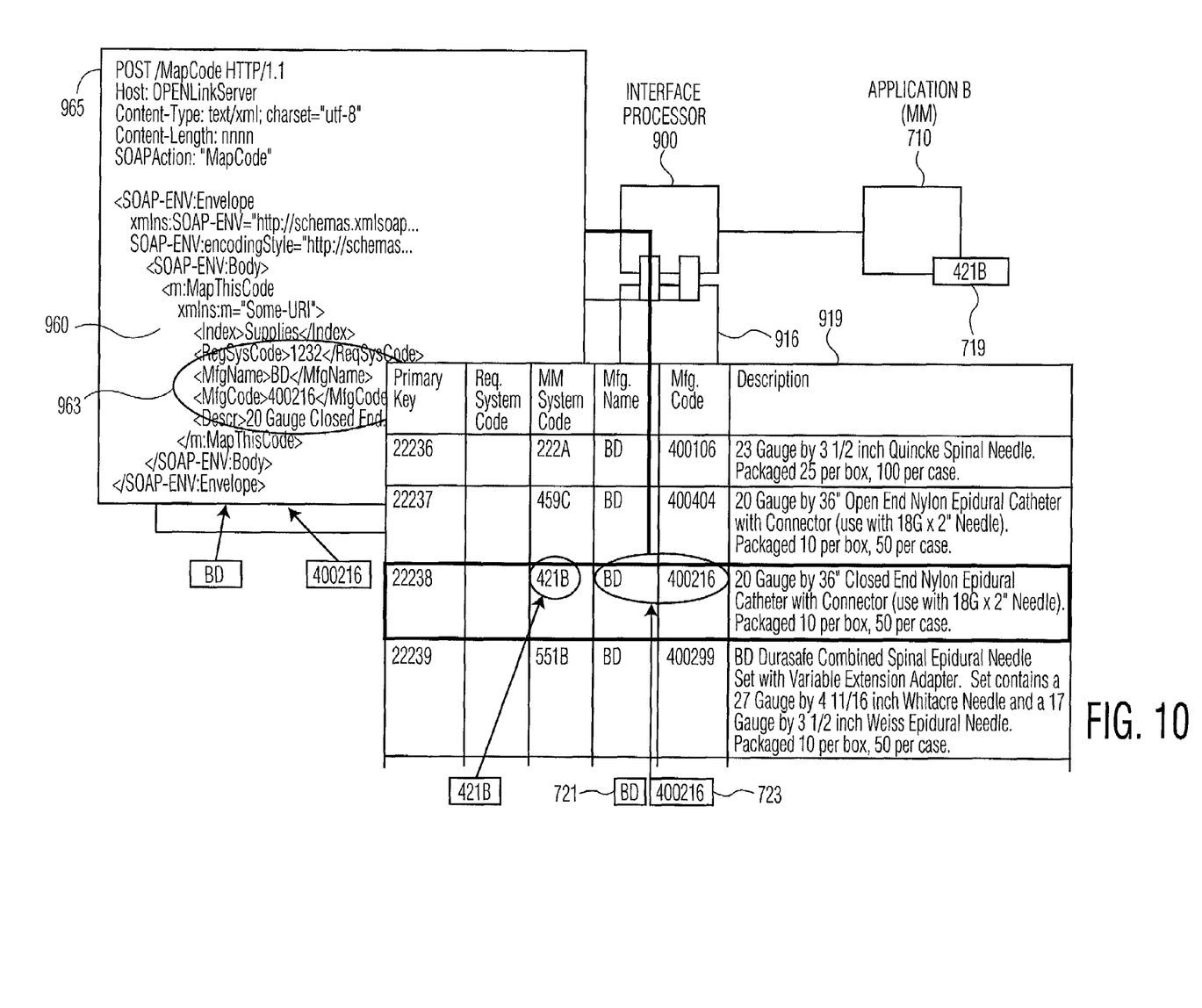
FIG. 10 illustrates an index based search of an identifier code mapping database in response to a message received from a requistioning application, according to invention principles.

FIG. 10 illustrates an index based prioritized search by application 916 of the co-located remote identifier code mapping database in response to the HTTP POST message 965 (FIG. 10) received from application 900 of FIGS. 7-12. Specifically, in step 325 of FIG. 3, a prioritized search is performed of index table 919 which resides within the mapping database. The rules governing the prioritized search are passed as a part of the SOAP and XML parameter block of message 965. The rules 960 and 963 of message 965 initiate application 916 to firstly search index table 919 for an exact match of the requisitioning system code (value 1232). If this is unsuccessful, application 916 initiates a search for an exact match of the manufacturer name and supply code (BD and 400216 respectively, items 721 and 723). In this example, index table 919 does not contain a value 1232 in the requisitioning system code column, and therefore the first rule is not satisfied. However, there is an entry with manufacturer name "BD" and manufacturer's item code 400216, so the second rule is satisfied. Notice that this entry has a value for the Material Management system code, which is "421B". This is the value needed to identify the Material Management system part number for the catheter for inclusion in a message to be communicated to Material Management system application 710. In another embodiment the rules governing the prioritized search may be defined within application 916 or may be defined as an attribute of the mapping database and index table 919. In the case that the prioritized search rules are defined in this manner, search rules provided by a received message (e.g., in a parameter block of message 965) take precedence. In step 330 of FIG. 3, application 916 updates the mapping database to incorporate the requisitioning system identifier code (1232) received from application 700 and generates a record of both the database search and provision of the mapped identifier code (421B) to application 900. This generated record is used for billing for the search (e.g., on a per search basis) and for creating a transaction record concerning the purchase of catheters by application 700 from application 710.

Figure 11:
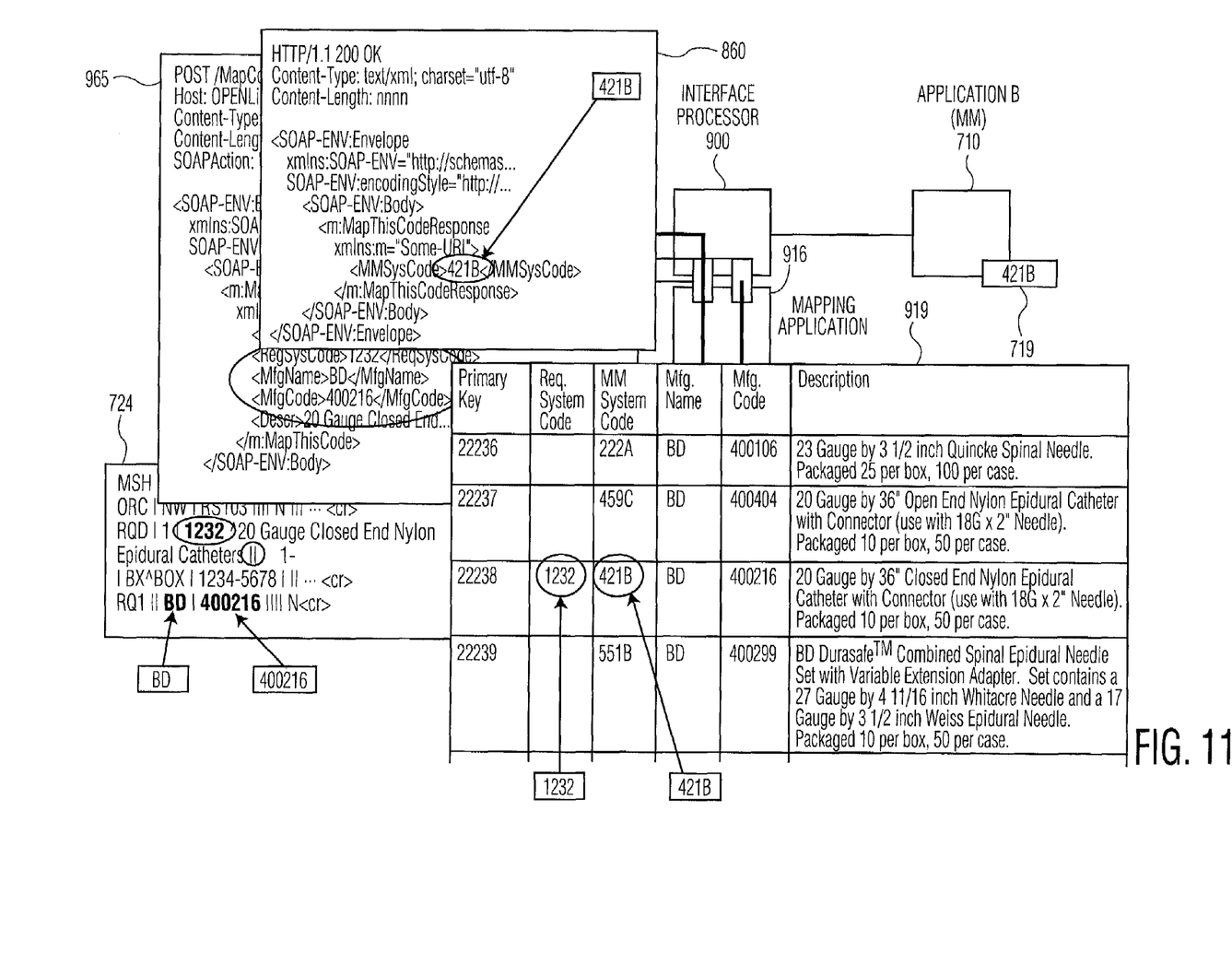
FIG. 11 illustrates the update of a mapping database and generation of a response message to a calling application, according to invention principles.

FIG. 11 illustrates the update of the mapping database and generation of a response message including the mapped identifier code (421B) for communication to interface application 900 by application 916. Specifically, application 916 (FIG. 11) updates index table 919 of the mapping database to include the requisitioning system identifier code (1232) conveyed from application 700 to application 900 in message 724 and from application 900 to application 916 in message 965. The requisitioning system identifier code (1232) is incorporated in index table 919 and thereby linked via table 919 with corresponding Material Management System code (421B) and Manufacturers name (BD) and code (4400216). Consequently, subsequent searches of the mapping database and index table 919 for requisitioning system code (1232) are satisfied in the first part of the search of index table 919 (i.e., the search for an exact match of the requisitioning system code). Also, messages from the Material Management system back to the requisitioning system involving mapping a Material Management application 710 identifier code to a requisitioning application 700 code are supported by the updated index table 919. In addition to updating index table 919, application 916 formats a response message 860 in SOAP and XML formats including the mapped identifier code (421B) and communicates message 860 in HTTP protocol to application 900.

Figure 12:
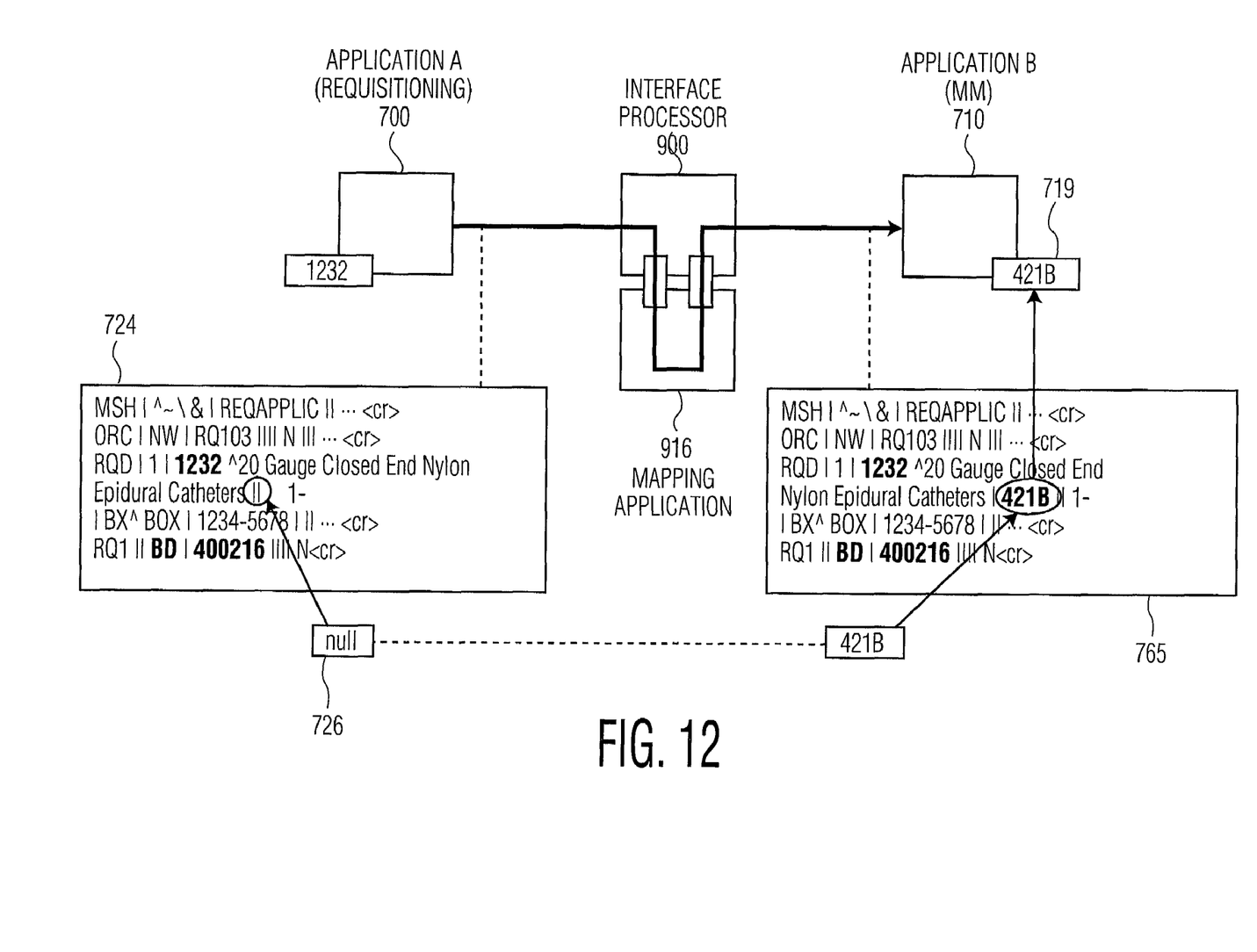
FIG. 12 illustrates the forwarding of a mapped code received from a mapping database in response to a message received from a requisitioning application, according to invention principles.

In step 335, application 900 receives the mapped identifier code (421B) in message 860 from application 916. Interface processor application 900 in step 340 incorporates the mapped identifier code (421B) in message 724 previously received from requisitioning system application 700 to form message 765 for forwarding to Material Management system application 710. FIG. 12 illustrates the forwarding of mapped code 421B received from the mapping database application 916 using message 724 received from requisitioning application 700. Specifically, mapped identifier code 421B is inserted in null data location 726 to create message 765 which is forwarded to Material Management application 710. Alternatively in other embodiments, the mapped identifier code (421B) is provided back to requisitioning system application 700 by application 900 or application 900 creates a new message of different format than message 724 to include mapped identifier code 421B for communication to application 710. Application 900 also creates and retains a record of communicating mapped identifier code 421B to the application 710 (or another application). The process of FIG. 3 is complete at step 345.

Figure 4:
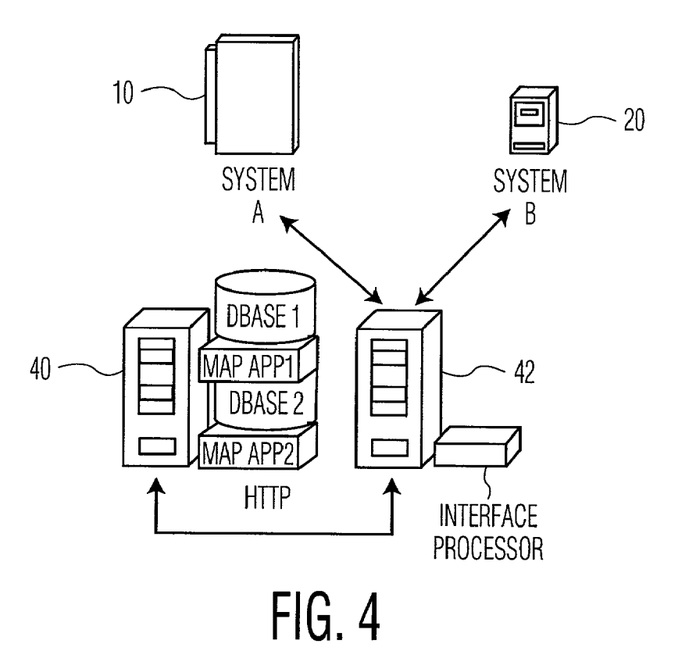
FIG. 4 shows an identifier code translation system involving multiple identifier code mapping databases co-located on a single server, according to invention principles.

FIG. 4 shows an identifier code translation system involving multiple mapping databases co-located on a single server. The FIG. 4 system advantageously provides multiple identifier code mapping databases in a configuration that alleviates the need to manually synchronize the multiple different identifier code mapping databases and files. In this configuration, an identifier code of a part used by System A (10) is mapped by an interface processor application operating on server 42 using multiple mapping databases (and associated accessing applications) co-located on server 40 remote from server 42. The System A (10) identifier code is communicated by the server 42 interface processor application to server 40 using SOAP, XML and HTTP POST message protocols in a similar fashion to that described in connection with FIG. 3. The server 42 interface processor application communicates a plurality of messages in SOAP and XML format to a corresponding plurality of co-located server 40 database applications (e.g., APP1, APP2) used for interrogating their respective databases (e.g. DBASE1, DBASE2). The individual server 40 database applications initiate a search of their respective databases and prepare and communicate response messages including discovered requested mapped identifier codes. The response messages are communicated in XML and SOAP format using HTTP protocol back to the server 42 interface application.

In other embodiments, interrogated database applications unable to locate a corresponding identifier code also respond (as well as those applications that discover a corresponding mapped identifier code) with a message indicating such a search failure. Also, in another embodiment, instead of multiple database applications operating on server 40, a single server 40 database application is used to interrogate the multiple co-located databases in server 40. In this case a single message is sent to the server 40 application and a single response message is sent from server 40 (using the protocols previously described) to server 42 conveying corresponding mapped identifier codes. Further, the multiple databases operating on server 40 are advantageously updated using identifier codes received from the interface application operating on server 42 in a similar manner to that described in connection with FIG. 3 (step 330). The mapped identifier code received from server 40 is incorporated in a message for forwarding to System B by the server 42 application (as described in connection with FIG. 3). Thereby the server 42 application supports exchange of data and communication between applications operating on System A and System B respectively.

The FIG. 4 identifier code translation configuration involving multiple mapping databases co-located on a single server advantageously enables a user to maintain separate identifier code translation databases. This may be used for a variety of purposes such as to separate test and production systems, for example. It is also advantageous in optimizing the allocation of processor, storage and other server resources between applications. For example, more frequently accessed databases may be given a higher priority. Further, separation of databases in this manner potentially reduces database corruption and security problems. A further advantage arises when customers employ an Application Service Provider (ASP) to host their respective identifier code mapping databases. In this case, the mapping databases may be maintained current and separate yet benefit from communication with multiple other databases.

Figure 5:
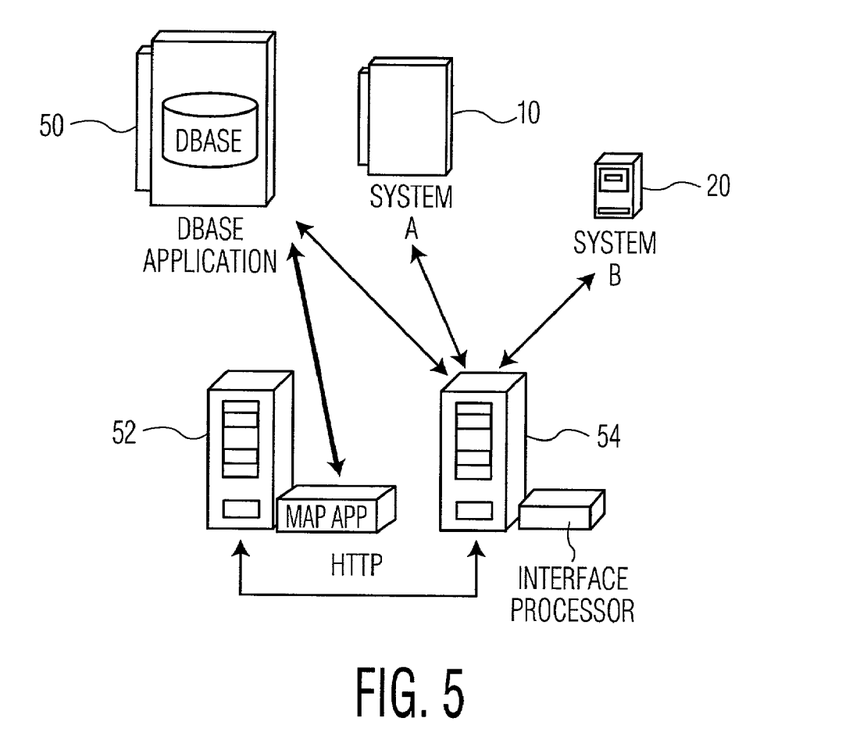
FIG. 5 shows an identifier code translation system involving a mapping application communicating with a remote identifier code mapping database via an application used for accessing the database, according to invention principles.

FIG. 5 shows an identifier code translation system involving a mapping application communicating with a remote mapping database via an application used for accessing the database. In this configuration, an identifier code of a part used by System A (10) is communicated by an interface processor application operating on server 54 to a mapping application on server 52. The server 52 mapping application uses a mapping database (and associated accessing application) located on server 50 remote from server 52 and server 54. The System A (10) identifier code is communicated by the server 54 interface processor application to the server 52 mapping application using SOAP, XML and HTTP POST message protocols in a similar fashion to that described in connection with FIG. 3. The server 52 mapping application also communicates a message in SOAP and XML format to the server 50 database application used for interrogating the server 50 identifier coded mapping database. The server 50 database application initiates a search of the server 50 database and prepares and communicates a response message including a discovered requested mapped identifier code. The response message is communicated in XML and SOAP format using HTTP protocol back to the server 54 interface application. In another embodiment the response message may be communicated using the SOAP, XML and HTTP protocols to the server 54 interface application via the server 52 mapping application.

The server 54 interface application incorporates the received mapped identifier code in a message for forwarding to System B (as described in connection with FIG. 3). Thereby the server 54 application supports exchange of data and communication between applications operating on System A and System B respectively. Further, the database on server 50 is advantageously updated using identifier codes received from the mapping application operating on server 52 in a similar manner to that described in connection with FIG. 3 (step 330). An advantage of the FIG. 5 configuration is that the server 52 mapping application accesses the remote identifier code mapping database on server 50 using calls to the server 50 application associated with this database and does not access the mapping database directly. This means that the mapping application on server 52 does not need to be aware of the structure of the server 50 database. This eliminates the necessity for the mapping application on server 52 to structure the message to the server 50 to initiate a search tailored to the structure of the server 50 database.

Figure 6:
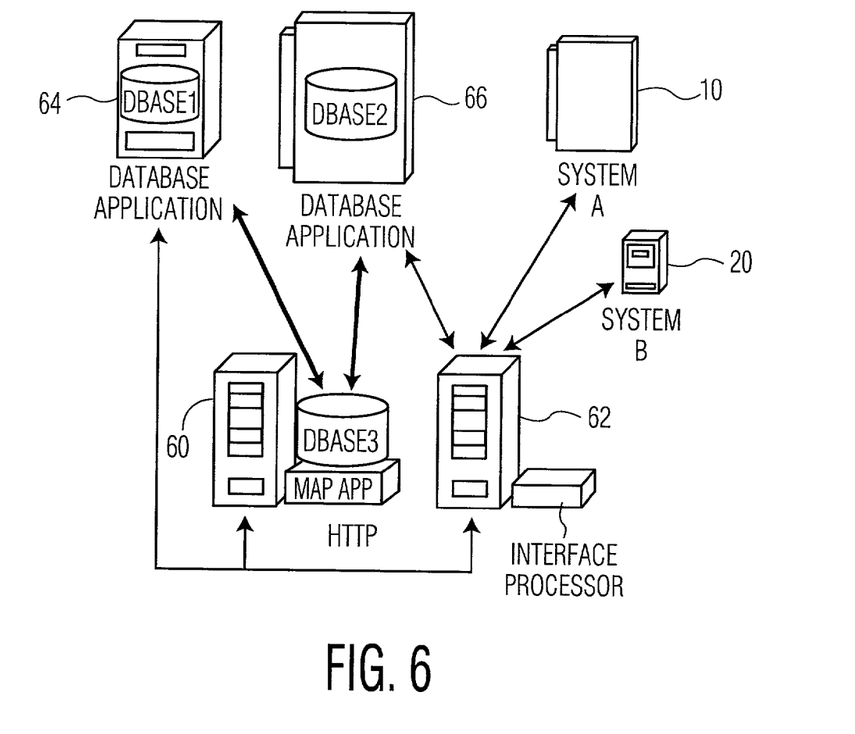
FIG. 6 shows an identifier code translation system involving a mapping application communicating with multiple local and remote identifier code mapping databases via corresponding access applications, according to invention principles.

FIG. 6 shows an identifier code translation system involving a mapping application communicating with multiple local and remote identifier code mapping databases via corresponding database access applications. in this configuration, an identifier code of a part used by System A (10) is communicated by an interface processor application operating on server 62 to remote database access applications (accessing databases 1 and 2) operating on servers 64 and 66 respectively. The identifier code of the part is also communicated by the interface processor application of server 62 to a mapping application operating on remote server 60 used for accessing a database application (accessing database 3) also resident on server 60. The server 62 interface application communicates the identifier code to the remote server 64 database access application and to the mapping application on server 60 using SOAP, XML and HTTP POST message protocols in a similar fashion to that described in connection with FIG. 3.

The server 62 interface application communicates the identifier code to the remote server 66 database access application using IP and other Internet compatible protocol. In other embodiments, different communication protocols (including non-Internet compatible protocols) may be used for communication to local or remote database access applications. The database applications operating on servers 64 and 66 and the mapping application on server 60 initiate searches of their respective databases for corresponding identifier codes (of the System A part). In this embodiment the server 62 interface application determines which database applications to communicate with and determines the order in which such databases should be interrogated to find a corresponding identifier code. However, in another embodiment the server 60 mapping application is provided with the identifier code and the mapping application determines which databases to interrogate and in which order. In this case the mapping application manages the communication of database application interrogation messages. The remote and local databases may be interrogated sequentially until a corresponding mapped identifier code is successfully determined or the databases may be interrogated in parallel, for example.

The interrogated database applications on servers 60, 64 and 66 individually prepare and communicate a response message including any discovered requested mapped identifier code. The response message from the mapping application on server 60 is communicated in XML and SOAP format using HTTP protocol back to the server 62 interface application. The response message from the database application on server 64 is communicated in XML and SOAP format using HTTP protocol back to the server 62-interface application via the server 60 mapping application. The response message from the database application on server 66 is communicated using IP and other Internet compatible protocols directly back to the server 62 interface application. In an alternative embodiment the response messages may be communicated using different protocols directly to the server 62 interface application or to the server 62 interface application via the server 60 mapping application.

The server 62 interface application incorporates the received mapped identifier code in a message for forwarding to System B (as described in connection with FIG. 3). Thereby the server 62 application supports exchange of data and communication between applications operating on System A and System B respectively. Further, the identifier code mapping databases on servers 60, 64 and 66 are advantageously updated using received identifier codes in interrogation messages received from the server 62 interface application in a similar manner to that described in connection with FIG. 3 (step 330). An advantage illustrated by the FIG. 6 configuration comprises use of a managing application such as the mapping application of server 60 or the interface application of server 62 (or applications in conjunction) to selectively initiate interrogation of multiple local or remote identifier code mapping databases. This enables a distributed array of databases to be selectively used at the option of a managing application for the transparent and seamless mapping of an identifier code associated with one entity (e.g., a requisitioning system) to a corresponding identifier code associated with a different entity (e.g., a materials management system) using Internet or other protocols. Further, the databases used for this purpose may be dynamically changed by the addition or removal of databases from an access list.

The architectures and processes presented in FIGS. 1-12 are not exclusive. Other architectures and processes may also be derived in accordance with the principles of the invention to accomplish the same objectives. Further, the inventive principles may be advantageously employed in any business or scientific context involving identifier code translation or cross-referencing. Specifically, the inventive principles are applicable where codes and identifiers need conversion or translation among networked computer applications and where it is impractical or burdensome to modify the executable applications involved to provide this translation. This may occur when a transaction-involves networked applications from multiple vendors to process a sequence of tasks such as in the catheter ordering example involving the requisitioning system and materials management system transaction previously described. It may also occur upon merger of computer systems using disparate codes to identify a common object. For example, if Bank A acquires Bank B, a merged computer system may need to cross-reference customer account numbers, loan identification numbers, employee numbers, branch codes, and so on. Another example, occurs when a company migrates from one computer system to another. In this case, identifiers and codes from the old system may need to be mapped to those assigned by the new system.

REFERENCES

Extensible Markup Language (XML)—an Internet standard maintained by the World Wide Web Consortium used to encode structured data passed between computer systems.

Simple Object Access Protocol (SOAP)—an Internet standard submitted to the World Wide Web Consortium for using XML to invoke remote procedure calls.

Hypertext transfer protocol (HTTP)—this is the public Internet standard maintained by the Internet Engineering Task Force for networking computer systems.

What is claimed is:

1. A method for determining identifier codes for an object associated with a plurality of identifier codes by a corresponding plurality of entities, comprising the activities of:

receiving a first message supporting a commercial transaction and including at. least a first identifier code identifying an object, said first identifier code being associated with a first entity;

extracting said first identifier code from said received first message;

accumulating, in a first database, object identifier code mapping information from identifier codes derived from data representing messages supporting commercial transactions and sent between entities desiring to effect a commercial transaction;

generating a plurality of messages incorporating said extracted first identifier code, said plurality of messages being for initiating a search of a plurality of different identifier code databases including said first database, said databases linking said first identifier code associated with said first entity to corresponding different identifier codes identifying said object, said different identifier codes being associated with entities different to said first entity; and receiving said different identifier codes corresponding to said first identifier code in response to communicating said plurality of messages.

2. A method according to claim 1, wherein said commercial transactions comprise purchase or sale of goods related transactions and including the activity of updating said plurality of databases to incorporate said different identifier codes identifying said object.

3. A method according to claim 1, wherein said mapping information supports translation of an identifier code within a message as the message passes through an interface processor.

4. A method according to claim 3, including the activity of communicating said plurality of messages to applications useable for initiating a search of said plurality of different remote identifier code databases and wherein said mapping information supports translation of an identifier code within a message as the message passes through an interface processor without any action affecting the translation by either a sending system or receiving system.

5. A method according to claim 1, wherein a message of said plurality of messages initiates a prioritized search of a database and an object comprises at least one of, (i) an article of manufacture, (ii) a service and (iii) a non-manufactured item and an entity comprises at least one of, (a) an object retailer, (b) an object wholesaler, (c) an object distributor, (d) an object manufacturer, (e) an object servicing enterprise and (f) an object seller.

6. A method according to claim 5, wherein said prioritized search of said database searches first for a purchaser product identifier code identifying said object and subsequently for a manufacturer product identifier code identifying said object.

7. A method according to claim 1, wherein said extracting activity comprises deriving said first identifier code and a corresponding third identifier code identifying said object from said received first message, and said generating activity generates a plurality of messages incorporating said derived first and third identifier codes.

8. A method according to claim 7, wherein said first identifier code comprises a purchaser product identifier code and said third identifier code comprises a manufacturer product identifier code and a message of said plurality of messages initiates a prioritized search of a database involving searching first for said purchaser product identifier code and subsequemly for a manufacturer product identifier code.

9. A method according to claim 1, wherein said mapping information supports translation of an identifier code within a message as the message passes through an interface processor without any action affecting the translation by either a sending system or receiving system.

10. A method according to claim 1, wherein
said messages supporting commercial transactions are messages effecting commercial transactions including purchase or sale of goods.

11. A method according to claim 1, including the activity of communicating said plurality of messages to applications for accessing databases using at least two of, (a) Hypertext Transfer Protocol (HTTP), (b) Simple Object Access Protocol (SOAP) and (c) XML (Extensible Markup language).

12. A method according to claim 1, wherein said
said method comprises an identifier code mapping application and said identifier code mapping application and one of said plurality of different remote identifier code databases are co-located on the same processor, said processor comprising one of (a) a server, (b) a PC (c) a wireless device, (d) a mainframe computer and (e) another networked processing device.

13. A method according to claim 1, wherein
messages supporting commercial transactions are messages effecting commercial transactions including purchase or sale of goods and said mapping information supports translation of an identifier code within a message as the message passes through an interface processor without any action affecting the translation by either a sending system or receiving system and
at least one of said first and said different identifier codes comprise one of (a) a Universal Product Code and (b) a code associated with a bar code.

14. A method for supporting a transaction in accordance with claim 1, wherein
said first message is received from an application initiating a transaction and including the activity of,
forwarding a composite message to a destination application in support of said transaction, said composite message being created including information derived from said first message and including one of said different identifier codes.

15. A method for determining a specific identifier code for an object associated with a plurality of identifier codes by a corresponding plurality of entities, comprising the activities of:
receiving a first message supporting a commercial transaction and including at least a first identifier code identifying an object, said first identifier code being associated with a first entity;
deriving said first identifier code from said received first message;
accumulating, in a first database, object identifier code mapping information from identifier codes derived from data representing messages supporting commercial transactions and sent between entities desiring to effect a commercial transaction;
generating a second message incorporating said derived first identifier code, said second message being for initiating a search of said first database mapping said first identifier code associated with said first entity to a corresponding second identifier code identifying said object and said second message incorporates data representing rules determining conduct of said search of said identifier code database, said second identifier code being associated with a second entity different to said first entity; and
receiving said second identifier code corresponding to said first identifier code in response to communicating said second message.

16. A method for determining identifier codes for an object associated with a plurality of identifier codes by a corresponding plurality of entities, comprising the activities of:
receiving a first message supporting a commercial transaction and including at least a first identifier code identifying an object, said first identifier code being associated with a first entity;
deriving said first identifier code from said received first message;
accumulating, in a first database, object identifier code mapping information from identifier codes derived from data representing messages supporting commercial transactions and sent between entities desiring to effect a commercial transaction;
generating a plurality of messages incorporating said derived first identifier code, said plurality of messages being for initiating searches of said first database and a remote identifier code database, said databases mapping said first identifier code associated with said first entity to corresponding different identifier codes identifying said object, said different identifier codes being associated with entities different to said first entity;
receiving said different identifier codes corresponding to said first identifier code in response to communicating said plurality of messages; and
updating said remote identifier code database to incorporate corresponding received different identifier codes identifying said object.

17. A method for providing identifier codes for an object associated with a plurality of identifier codes by a corresponding plurality of entities, comprising the activities of:
receiving from a remote source a first message supporting a commercial transaction and including at least a first identifier code identifying an object, said first identifier code being associated with a first entity and said first message requesting determination of a specific identifier code for said object;
deriving said first identifier code from said received first message;
accumulating, in a first database, object identifier code mapping information from identifier codes derived from data representing messages supporting commercial transactions and sent between entities desiring to effect a commercial transaction;
initiating a search of a plurality of different identifier code databases including said first database, said databases linking said first identifier code associated with said first entity to corresponding different identifier codes identifying said object, said different identifier codes being associated with entities different to said first entity using said extracted first identifier code;
receiving said different identifier codes corresponding to said first identifier code in response to said initiated search of said plurality of different identifier code databases; and
providing said different identifier codes to said remote source.

18. A method according to claim 17, including the activity of
generating a record of provision of said different identifier codes for use in at least one of, (a) billing, and (b) creating a commercial transaction record.

19. A system for identifier codes for an object associated with a plurality of identifier codes, comprising:
a communication processor for bidirectionally communicating with applications;

a plurality of different identifier code databases including a first database incorporating object identifier code mapping information accumulated from identifier codes derived from data representing messages supporting commercial transactions and sent between entities desiring to effect a commercial transaction;

a first application for, initiating a search of said plurality of different databases to translate a first identifier code identifying an object associated with a first entity to corresponding different identifier codes identifying said object, said different identifier codes being associated with entities different to said first entity, in response to receiving a message supporting a commercial transaction and including a plurality of corresponding identifier codes identifying said object and provided by applications, and for updating at least one of said plurality of different databases to incorporate corresponding different identifier codes identifying said object; and providing said different identifier codes, corresponding to said first identifier code in response to said initiated search of said plurality of different identifier code databases, via said communication processor.

20. A method according to claim 19, wherein an object comprises at least one of, (a) an article of manufacture, (b) a service and (c) a non-manufactured item and an entity comprises at least one of, (a) an object retailer, (b) an object wholesaler, (c) an object distributor, (d) an object manufacturer, (e) an object servicing enterprise and (f) an object seller.

* * * * *